March 3, 1964   G. L. McKELVEY   3,123,238
TIRE MOUNTING DEVICE
Filed Oct. 31, 1960
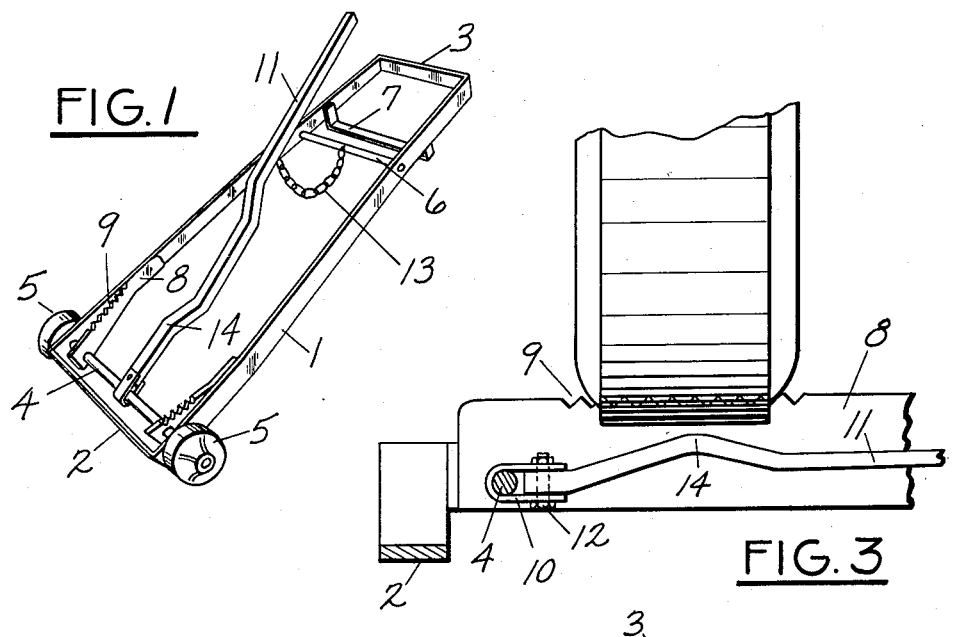
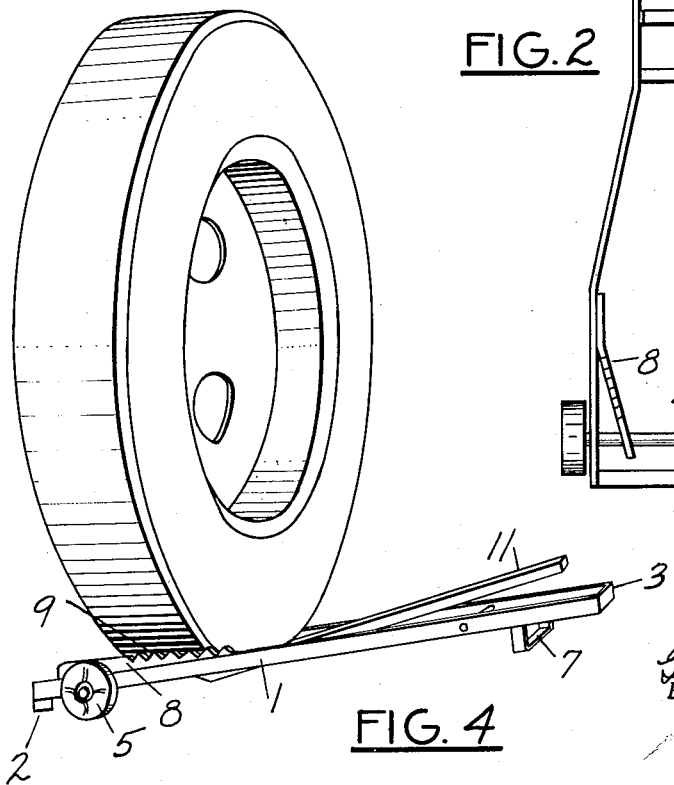
INVENTOR.
George L. McKelvey
BY Ralph Hammar
Attorney United States Patent Office 3,123,238
Patented Mar. 3, 1964

3,123,238
TIRE MOUNTING DEVICE
George L. McKelvey, Meadville, Pa., assignor to Starn Tool and Manufacturing Company, Meadville, Pa., a partnership of Pennsylvania
Filed Oct. 31, 1960, Ser. No. 66,291
5 Claims. (Cl. 214—332)

This invention is a hand truck for moving automobile tires into mounting position. It eliminates heavy lifting and permits both raising and rotating the tire to bring it into alignment with the mounting lugs.

In the drawing, FIG. 1 is a perspective of the device, FIG. 2 is a top plan view, FIG. 3 is a fragmentary section showing the relation of the tire to the lever for raising and rotating the tire to move it into alignment with the mounting lugs, and FIG. 4 is a side view showing the position of the tire as it is being trucked into mounting position.

The frame has side rails 1 connected by a cross member 2 at the front and by a cross member 3 at the back. The cross member 3 serves as a handle. Adjacent the cross member 2 is an axle 4 carrying wheels 5. The frame is further braced by a cross member 6 and by a U shaped member 7 providing a supporting leg which, in conjunction with the wheels 5, supports the frame in a substantially horizontal position when it is lowered.

Extending between the side rails 1 and the axle 4 are struts 8 having serrated upper edges 9 inclined upwardly toward the front of the frame. When the truck is lowered to the horizontal position, the tire to be mounted is easily rolled up onto the serrated edges 9 which provide a cradle support on which the tire can be steadied with one hand while the other hand lifts the handle so the tire can be trucked to mounting position. The serrated edges grip the tread of the tire and hold it against slipping even when the frame is raised to an angle of 45 degrees. The spacing of the struts 8 depends on the diamter of the tire to be handled. For large size truck tires, the struts 8 are spaced further apart and for smaller size passenger car tires, the struts are spaced closer together.

At the center of the axle 4 is pivoted a bracket 10 connected to the front end of a lever 11 by a vertical pivot 12. This provides a universal connection for the front end of the lever 11, permitting movement up and down and sideways to the extent permitted by a chain 13 connected between the lever 11 and the cross member 6. The lever 11 has a raised section 14, as shown in FIG. 3, which makes point contact with the underside of the tread on the tire to lift the tire vertically or rotate the tire to the righ or left.

In use, the tire is rolled onto the serrated edges 9 while the frame is in the lowered or horizontal position. This is easy to do because the edges 9 are close to the ground and the frame is stably supported by the wheels 5 and foot 7. While the tire is held in an upright position by one hand, the handle 3 is grasped by the other hand and the frame is raised to a comfortable angle (e.g. 30°–45°) for trucking the tire to mounting position. Upon reaching the mounting position, the frame is lowered to the horizontal position. At this point, the tire will usually be out of alignment with the mounting lugs. In order to bring the tire into alignment with the mounting lugs, several manipulative procedures are possible. Lifting up on the handle 3 raises the tire. The tire can also be raised by lifting on the free end of lever 11. This brings raised section 14 of the lever into essentially point contact with the tread and lifts the tire off the serrated edges 9. While the tire is lifted off the edges 9, it can be rotated by swinging the lever 11 laterally. These manipulations can be done with one hand while the tire is steadied with the other hand. By one or more of these procedures, the tire is easily brought into alignment with the mounting lugs and can be moved into place with little effort.

The device is not only useful for handling heavy truck tires weighing hundreds of pounds, but it is also useful in passenger car tires where the mounting lugs are frequently in inaccessible locations in which it is awkward to lift the tire into place.

The device is also useful in removing tires. When so used, the vehicle is jacked up until the device can be slid beneath the tread of the tire to be removed. In this position it is easy to lift the tire off the lugs by the same procedures which will later be used in installing the new tire.

What is claimed as new is:

1. A hand truck for moving tires into mounting position and aligning the same with mounting lugs comprising, a frame having wheels at the front and a handle at the back by which the frame may be lifted to an inclined trucking position, a leg on the frame cooperating with the wheels to support the frame in a lowered generally horizontal position, laterally spaced members at the front of the frame having upper serrated edges extending generally lengthwise of the frame and positioned so that when the frame is in its lowered position a tire may be rolled crosswise onto the serrated edges which grip the tread of the tire and provide a cradle support on which the tire may be steadied with one hand in a generally upright position while the frame is lifted by the other hand to an inclined trucking position and wheeled to mounting position at which time the frame is returned to the lowered position, and a lever having a universal pivot on the frame with a portion of the lever beneath the tread of the tire for engaging the tread of the tire and lifting it off the serrations and for moving the tread of the tire laterally to rotate the tire to bring it into alignment with the mounting lugs.

2. A hand truck for moving tires into mounting position and aligning the same with mounting lugs comprising, a frame having wheels at the front and a handle at the back by which the frame may be lifted to an inclined trucking position, a leg at the back of the frame cooperating with the wheels to support the frame in a lowered generally horizontal position, laterally spaced tire supporting structure at the front of the frame positioned so that when the frame is in its lowered position a tire may be rolled crosswise onto the supporting structure and steadied with one hand in a generally upright position while the frame is lifted by the other hand to an inclined trucking position and wheeled to mounting position at which time the frame is returned to the lowered position, and a lever having a universal pivot on the frame with a portion of the lever beneath the tread of the tire for engaging the tread of the tire and moving the tire upward and laterally as required to bring the tire into alignment with the mounting lugs.

3. A hand truck for moving tires into mounting position and aligning the same with mounting lugs comprising, a frame movably supported on wheels and having means for resting the frame in any desired location, tire supporting structure on the frame positioned so that a tire may be rolled onto the supporting structure and steadied with one hand in a generally upright position while the frame is wheeled to mounting position at which the frame is rested, and a lever having a universal pivot on the frame with a portion of the lever beneath the tread of the tire for engaging the tread of the tire and moving the tire upward anl laterally as desired to bring the tire into alignment with the mounting lugs.

4. A hand truck for moving tires into mounting position and aligning the same with mounting lugs comprising, a frame having a supporting wheel, a cradle support on the frame onto which a tire may be rolled and supported in an upright position, and a lever having a universal pivot on the frame and with a portion of the lever beneath the tread of a tire cradled on said support for engaging the tread of the tire and moving the tire upward and laterally as required to bring the tire into alignment with the mounting lugs.

5. A hand truck for moving tires into mounting position and aligning the same with mounting lugs comprising, a mobile frame, tire supporting structure on the frame positioned so that a tire may be rolled onto the supporting structure and steadied with one hand in a generally upright position while the frame is moved to mounting position, and lever means beneath the tread of the tire for engaging the tread of the tire and moving the tire upward and laterally as desired to bring the tire into alignment with the mounting lugs.

References Cited in the file of this patent

FOREIGN PATENTS 642,021     Germany _____ Feb. 20, 1937